Figure 1:
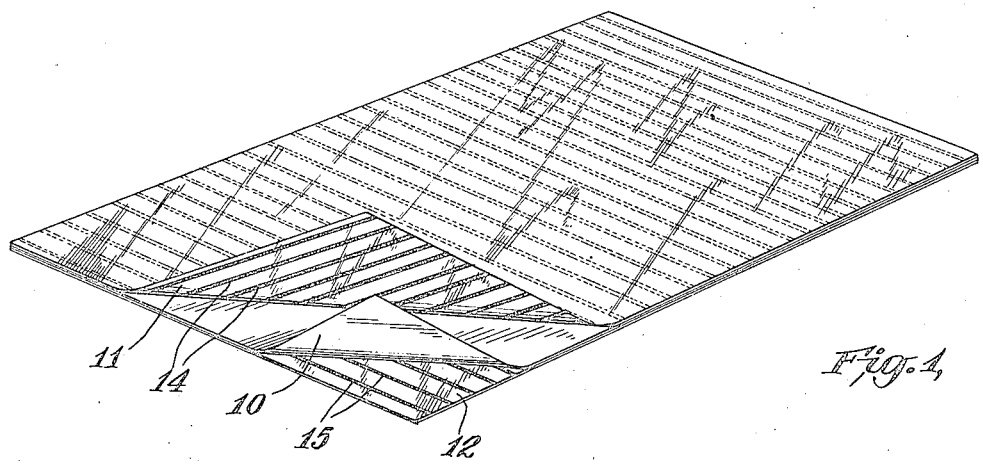

Feb. 13, 1923.

J. S. CLUNE.
COMPOSITE METAL FOIL SHEET.
FILED FEB. 10, 1922.

1,445,070.

INVENTOR
JOHN S. CLUNE
BY
Meyers, Cavanagh & Whitehead
ATTORNEYS

Patented Feb. 13, 1923.

1,445,070

UNITED STATES PATENT OFFICE.

JOHN S. CLUNE, OF ROSELLE PARK, NEW JERSEY, ASSIGNOR TO THE CONLEY FOIL COMPANY, OF NEW YORK, N. Y., A CORPORATION OF NEW YORK.

COMPOSITE METAL-FOIL SHEET.

Application filed February 10, 1922. Serial No. 535,434.

*To all whom it may concern:*

Be it known that I, JOHN S. CLUNE, a citizen of the United States, and resident of Roselle Park, in the county of Union and State of New Jersey, have invented certain new and useful Improvements in Composite Metal-Foil Sheets, of which the following is a specification.

This invention relates to composite sheet material and more particularly to a flexible composite sheet especially adapted for use in the manufacture of bags, pouches, wrappers, liners and the like; and has special reference to the provision of a composite sheet having the characteristics of flexibility, pliability and impermeability to air and moisture.

As is well known, for packaging various articles of consumable merchandise in which it is desired to preserve the flavor, aroma, fragrance or taste of the articles, it is very desirable to utilize a metallic leaf or foil product in the package, the leaf or foil being highly impermeable to air and moisture. A known disadvantage in the use of metal foil for packaging purposes, however, resides in the fact that the foil is extremely frail and breakable, the foil being subject to the liability of easy tearing during normally rapid packaging steps. To increase the strength of the foil it has therefore been common to provide reinforcing layers such as relatively heavy paper, carboard, fabric or the like, the latter being adhesively attached or united to the foil to produce a composite sheet, the composite sheet being obtained by coating the foil layer or the reinforcing layer or sheet or both with a coat of adhesive and uniting the said layers together. In the production of prior composite sheets of this nature known to me, although the metal leaf or foil is suitably reinforced, the resulting composite sheet does not possess the flexibility and pliability characteristics of the metal layer itself, this being especially necessary when it is desired to freely manipulate the composite sheet in the shaping and forming of pouches, bags, wrappers, etc., in use, for example, for packaging commodities such as tea, coffee, spices and tobacco. The provision of a composite foil product in which the foil layer is desirably and suitably reinforced to produce a strengthened foil retaining the characteristics for permitting easy manipulation in the forming of packages and pouches is a principal object of my present invention.

One of the objections to the use of prior composite sheets known to me lies in the use of relatively heavy reinforcing layers with the result that the composite sheet obtained is, relatively speaking, too "stiff", hard and non-pliable to be shaped into packages such as pouches or bags, such sheets not readily yielding to the forming members operative thereon. I have found also that the coating of glue or other adhesive used to unite the layers of composite sheets also adds in rendering the sheet non-pliable and relatively non-yieldable, the dried coat of adhesive spread over the complete surface of the foil or reinforcing layer lending added brittleness and stiffness to the sheet, this being decidedly objectionable when the sheet is to be folded and bent in the desired bag or pouch configuration. To eliminate these disadvantages and to provide a composite sheet in which the layers may be united to produce a workable and highly serviceable product is a principal object of my present invention.

In the making, forming and shaping of wrappers or pouches for packaging tobacco and tea, for example, it is very desirable, furthermore, to reinforce the metal foil layer on opposite faces thereof so that both sides of the metal foil may be protected against injury when moved into contact with the forming members in the pouch forming process, this being especially necessary where machinery is used in the making of the pouches in quantity. In one type of machine, for example, a movable forming plunger will engage one face of the composite sheet and move the same through forming channels situated on the opposite side of the sheet. What is desired when the pouches are made with a machine of this type, for example, is a full protection for both sides of the metal layer to prevent injury thereto while at the same time retaining that flexibility and yieldability of the composite sheet which permits quick manipulation and forming of the pouch by means of the oppositely arranged forming members. Another desideratum here lies in the provision of a flexible composite sheet in which the outer layers or surfaces will have sufficient smoothness to permit of an easy sliding movement of the sheet through the channels with the least resistance during pouch formation. To accomplish these results and to provide for the greatest economy, efficiency and convenience in the formation of pouches from such material, my invention contemplates, more specifically, the provision of a composite sheet in which both faces of the metal foil are reinforced by thin, flexible, smooth and relatively tough reinforcing sheets or layers.

Figure 2:
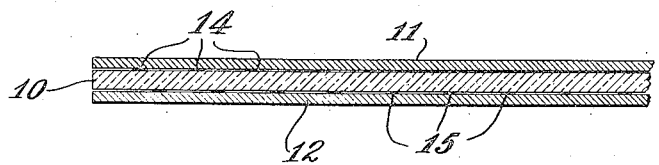

To the accomplishment of the foregoing and such other objects as may hereinafter appear, my invention consists in the elements and their relation one to the other, as hereinafter particularly described and sought to be defined in the claims, reference being had to the accompanying drawings which show a preferred embodiment of my invention and in which:

Figure 1 is a perspective view of my composite sheet showing the layers separated in part in order to disclose the construction, and Figure 2 is an enlarged cross sectional view of the same.

As hereinbefore referred to, a principal object of this invention relates to the provision of a composite sheet in which an impervious metal sheet or layer is combined with reinforcing sheets to produce a flexible and pliable product. To this end my invention consists in attaching or uniting to the opposite faces of an intermediate layer or sheet of tin or lead foil 10, layers of glacine paper or the like such as 11 and 12. I have found that when glacine paper layers are united to opposite sides of the tin or lead foil that the foil is reinforced to the desired degree, the composite sheet being capable of withstanding rough handling in the packaging steps, the thin sheets of smooth glacine paper when combined with the layer of foil producing a resulting flexible, pliable and yieldable sheet capable of being easily fashioned and formed for packing purposes. The glacine paper is preferably applied to opposite faces of the foil, both sides of the foil being protected against injury and damage, the resulting sheet being capable of use in pouch and wrapper forming machines with facility, the opposing forming members in such a machine contacting, engaging and being operative on the reinforcing sheets or layers only. The provision of the glacine paper on opposite sides of the foil layer with its highly glossy and "slippery" surfaces has, furthermore, been found to yield a composite sheet capable of permitting the easy separation of superposed sheets, as when the top or bottom sheet is fed form a stack or pile during packaging or pouch forming operations.

To retain the desired flexibility of the composite sheet while at the same time uniting the layers together with adhesive, I have found it very suitable to unite or attach the layers together by means of very narrow closely spaced lines of adhesive which resemble and which I have termed "ruling lines" of adhesive. Referring to the drawings, the sheet or layer 11 is united to the foil layer 10 by means of the narrow parallel lines of adhesive 14 closely spaced in the form of "ruling lines", the sheet or layer 12 being correspondingly united to the metal foil 10 by the narrow parallel "ruling lines" of adhesive 15, these lines running longitudinally or across the composite sheet. In the making of the composite sheet I prefer to provide the "ruling lines" of adhesive on the glacine paper layers, the layers then being superimposed and united together. For the purpose of providing more points of attachment for the foil and for other purposes, I prefer to arrange the adhesive lines 14 intermediate the adhesive lines 15, this being clearly shown, for example, in Figure 2 of the drawings. I have found that when the sheets are united in this manner that besides the considerable economy in glue or other adhesive effected and besides overcoming the difficulty incident to the usual coating steps for this kind of product of supplying an even and thin coating of glue, that the composite sheet product which results retains all the characteristics of flexibility, pliability and yieldability possessed by the layers or sheets of metal and glacine papers themselves, the formation of pouches from a composite sheet of this kind having been found therefore highly convenient.

The manner of making and using my composite sheet will be fully apparent from the above detailed description thereof. It will be further apparent that I have provided a composite sheet in which the reinforcing sheets or layers are securely united to the foil layer, the latter being fully strengthened and completely protected against breaking and tearing on either face thereof, the whole presenting a metal foil product highly impervious to air and moisture and possessing those characteristics of flexibility and yieldability useful and necessary in the shaping, forming and making of bags, pouches and other packages used for preserving consumable or edible products.

While I have shown my device in the preferred form, it will be obvious that many changes and modifications may be made in the structure disclosed without departing from the spirit of the invention, defined in the following claims.

I claim:

1. A flexible composite sheet especially adapted for use in the manufacture of bags, pouches, wrappers, liners and the like, said sheet consisting of inner and outer layers of a thin and very flexible paper of a transparent nature and an intermediate layer of metal foil, said inner and outer paper layers being united to the intermediate foil layer by narrow lines of adhesive extending longitudinally of the sheet, said composite sheet having the characteristics of flexibility, pliability and impermeability to air and moisture.

2. A flexible composite sheet especially adapted for use in the manufacture of bags, pouches, wrappers, liners and the like, said sheet consisting of inner and outer layers of a thin and very flexible paper of a transparent nature, such as glacine paper and an intermediate layer of metal foil, said inner and outer paper layers being united to the intermediate foil layer by narrow closely spaced " ruling " lines of adhesive extending longitudinally of the sheet, said composite sheet having the characteristics of flexibility, pliability and impermeability to air and moisture.

3. A flexible composite sheet especially adapted for use in the manufacture of bags, pouches, wrappers, liners and the like, said sheet consisting of inner and outer layers of a thin and very flexible paper of a transparent nature, such as glacine paper and an intermediate layer of metal foil, said inner and outer paper layers being united to the intermediate foil layer by adhesive, said composite sheet having the characteristics of flexibility, pliability and impermeability to air and moisture.

4. A flexible composite sheet especially adapted for use in the manufacture of bags, pouches, wrappers, liners and the like, said sheet consisting of inner and outer layers of paper and an intermediate layer of metal foil, said inner and outer paper layers being united to the intermediate foil layer by narrow closely spaced ruling lines of adhesive extending longitudinally of the sheet and producing alternating attached and unattached areas or zones, said composite sheet having the characteristics of flexibility, pliability and impermeability to air and moisture.

5. A flexible composite sheet especially adapted for use in the manufacture of bags, pouches, wrappers, liners and the like, said sheet consisting of inner and outer layers of a thin and very flexible paper of a transparent nature, such as glacine paper and an intermediate layer of metal foil, said inner and outer paper layers being united to the intermediate foil layer by narrow closely spaced " ruling " lines of adhesive extending longitudinally of the sheet, the adhesive lines on one face of the sheet being arranged intermediate the lines on the reverse face of the sheet, said composite sheet having the characteristics of flexibility, pliability and impermeability to air and moisture.

6. A flexible composite sheet especially adapted for use in the manufacture of bags, pouches, wrappers, liners and the like, said sheet consisting of a layer of metal foil and a layer of thin pliable paper united to the foil layer by narrow closely spaced ruling lines of adhesive, producing alternating attached and unattached zones or areas, said united layers having the pronounced characteristics of flexibility and yieldability and the characteristic of impermeability to air and moisture.

Signed at New York in the county of New York and State of New York this 23rd day of January, A. D. 1922.

JOHN S. CLUNE.